M. EICHHOLTZ.

Equalizing-Cultivators.

No. 6,008. Reissued Aug. 11, 1874.

Witnesses.
D. G. Stuart
Leo Van Rinwick

Inventor.
Mathias Eichholtz
by W. B. Richards and
A. McCallum
Attys

THE GRAPHIC CO. PHOTO-LITH. 39 & 41 PARK PLACE, N.Y.

UNITED STATES PATENT OFFICE.

MATHIAS EICHHOLTZ, OF TROY, OHIO, ASSIGNOR TO HENRY H. PATTEE, OF MONMOUTH, ILLINOIS.

IMPROVEMENT IN EQUALIZING-CULTIVATORS.

Specification forming part of Letters Patent No. 88,557, dated April 6, 1869; reissue No. 6,008, dated August 11, 1874; application filed July 17, 1874.

*To all whom it may concern:*

Be it known that I, MATHIAS EICHHOLTZ, of Troy, in the county of Miami and State of Ohio, have invented certain new and useful Improvements in Cultivators.

The following description, taken in connection with the accompanying plate of drawings hereinafter referred to, forms a full and exact specification, wherein are set forth the nature and principles of the invention, by which the same may be distinguished from others for the same general purpose, together with what is claimed as new and which are desired to be secured by Letters Patent of the United States.

My invention relates to that class of machines used for cultivating a row of growing plants upon both sides at one time, or at one passage of the machine, commonly known as straddle-row cultivators; and the nature thereof consists in connecting two plow-beams by means of an arched beam-yoke, to which said plow-beams are hinged or jointed in such manner that the normal position of the plow-beams may be parallel with each other when the beam-yoke is thrown at oblique angles to the line of progression, (either plow-beam operating freely while in advance of the other,) and the plows be sustained in an upright working position, without rear connections or other supports, and at the same time permit of their being moved freely, independent of each other, in a lateral or vertical direction, by the handles. It further consists in the combination of a tongue or guide-pole with aforesaid devices, and which is adjustably and removably pivoted or hinged to the arched yoke in such manner that it may not interfere with aforesaid functions, and may be utilized as a guide-pole to assist in driving the animals, all as hereinafter fully described.

In the accompanying drawing, which illustrates my invention, and in which the similar letters used as marks of reference apply to the like parts in all of the figures—

Figure 1:
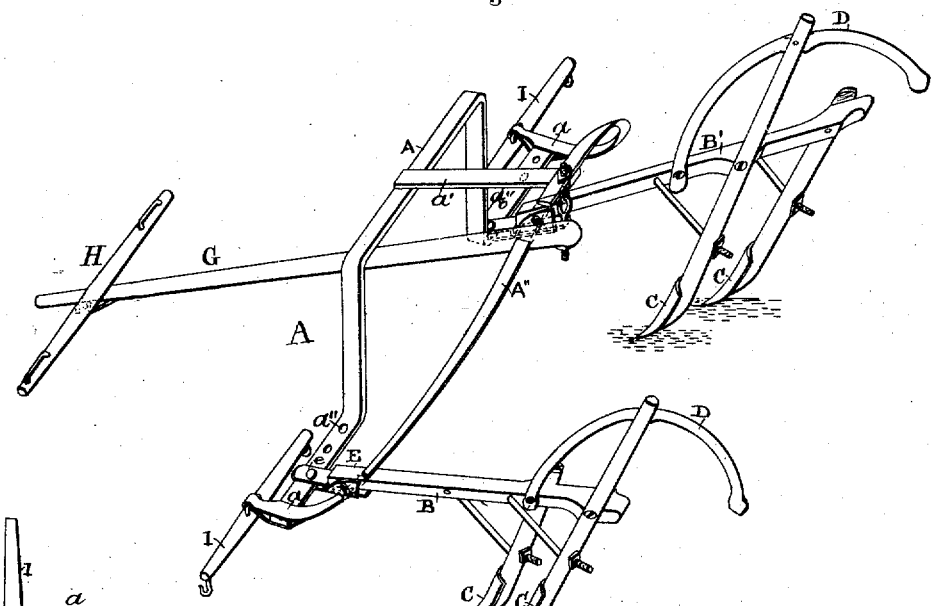
Figure 2:
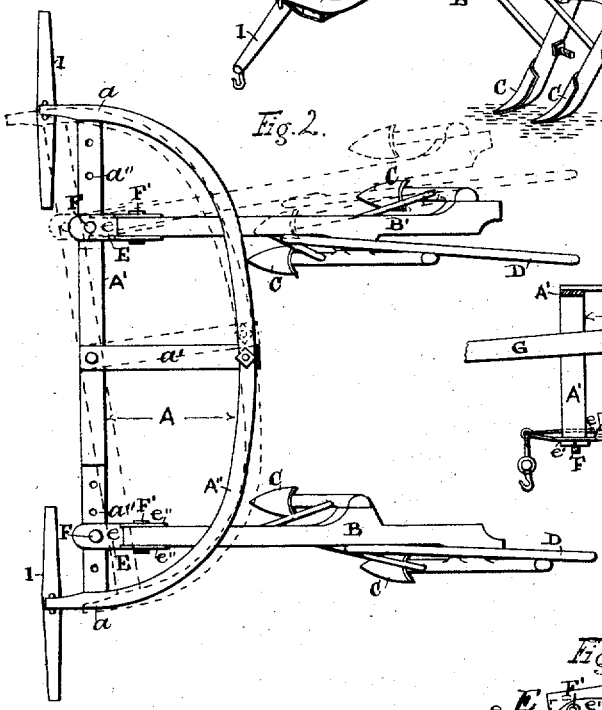
Figure 3:
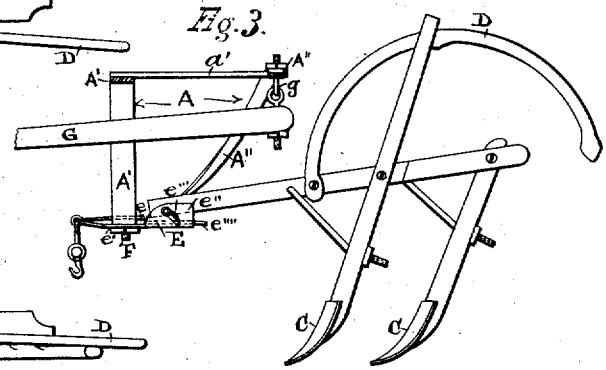
Figure 4:
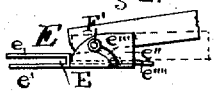

Figure 1 is a perspective view of a machine embodying my invention; Fig. 2 is a top or plan view of the same; Fig. 3 is a vertical sectional view on the plane of the line *x x* in Fig. 2; and Fig. 4 is a detail view, hereinafter referred to.

The construction and relative arrangement of the parts is as follows:

Letters A′ A″ represent two bars, connected rigidly together at *a a*, at their lower ends, and at their upper central parts by a bar, *a*′, and together form an arched or centrally-elevated yoke, A. The bar A′ is bent, as shown in the drawings, so that its ends are horizontal, and are pierced with a series of holes, *a*″, to which the plows are attached, and by which their distance apart may be adjusted, as hereinafter more fully described. B B′ represent ordinary cultivator-plow beams, each carrying at its rear end two cultivator shovels or plows, C C, and a handle, D. E E are the clevises or joint-pieces for hinging the plow-beams to the beam-yoke A. Their forward ends are bifurcated, or formed into two arms, *e e*′, which embrace the upper and lower sides, respectively, of the horizontal end parts of the bar A′, and are pierced with holes, through which bolts F pass, to secure them loosely immediately over either of the series of holes *a*″. The sides *e*″ *e*″ of each clevis are turned up to form plates, between which the forward end of the beam B is received, and between which it fits snugly, to retain it (the beam) in an upright position.

The plates *e*″ are pierced with arc-shaped slots *e*‴, through which and through the adjacent end of the beam the lateral beam-bolt F′ passes. The rear and bottom parts *e*⁗ of the clevises E are extended back of the rear ends of the plates *e*″, for purposes hereinafter described. G is a tongue or guide-pole, loosely pivoted or swiveled at its rear end to a pendent bolt, *g*, from the bar A″, as plainly shown at Fig. 3.

The bolt *g*, being provided with a nut on its upper end, the pole G may be readily put in place, and as readily removed. When in place, in operation it will occupy a position immediately over and in line with the row of plants, and may assist the driver as a guide-pole in directing the draft animals.

H is an ordinary neck-yoke. I I are the single-trees, attached one to each end of the beam-yoke A by ordinary interlocking eyes or hooks.

The draft-animals are attached to the single-trees I I, and in operating the machine they walk one on each side of the row of plants to be cultivated, each plow following the animal attached adjacent to its forward end, and consequently one on each side of said row of plants—each animal in a manner drawing its own plow independent of its fellow.

Either animal may advance or recede relatively to the position of the other, and thereby throw the beam-yoke A at various oblique angles with the line of progression of the machine, without disturbing the parallelism of the plow-beams with each other and with the line of progression, as will be plainly seen by the dotted lines at Fig. 2.

It will be obvious also that the last-described operation may take place with the tongue in place or removed from the machine, the pivot-bolt *g* allowing the yoke A to oscillate independent of the pole G when attached thereto, as herein described.

Each plow-beam has a free lateral movement or oscillation on the bolt F as a fulcrum, as shown by dotted-line view of the plow B′ at Fig. 2, and a similar vertical movement from the bolt F and the arc-shaped slot *e‴* in the beam-plate *e″*, a too extreme movement of the beam downward being prevented by the rearward projection *e⁗* of the clevis E, all as shown plainly at Fig. 4, which is a side elevation of the beam-coupling.

With a machine constructed as herein described, it will be obvious to those skilled in the art that either beam may freely operate in advance of the other, while both are drawn forward in the line of progression, and that the operator may also move either beam independently and freely to the right or left hand, and raise them above the ground, so as to clear obstructions, favor irregular plants, &c.

Having now described the manner in which my invention may be carried into effect, what I desire to secure by Letters Patent, is—

1. Two plow-beams, B B′, connected together by an elevated beam-yoke, A, so that either may operate in advance of the other, while both are drawn forward in the line of progression, the attachment of the plow-beams to said yoke being by joints, which sustain the plows in an upright working position without rear connections or other support, and permit of their being freely moved independently in a vertical or lateral direction, combined and operating substantially as described, and for the purpose specified.

2. The guide-pole G, pivoted to the beam-yoke A, and combined with said yoke and the plows B B′, substantially as described, and for the purpose specified.

MATHIAS EICHHOLTZ.

Witnesses:
J. W. COOPER,
F. C. THORNTON.